(12) United States Patent
Harris

(10) Patent No.: US 8,499,432 B2
(45) Date of Patent: Aug. 6, 2013

(54) WASTEGATE ASSEMBLY

(75) Inventor: Michael E. Harris, Fairview, NC (US)

(73) Assignee: BorgWarner Inc., Auburn Hills, MI (US)

( * ) Notice: Subject to any disclaimer, the term of this patent is extended or adjusted under 35 U.S.C. 154(b) by 848 days.

(21) Appl. No.: 12/042,071

(22) Filed: Mar. 4, 2008

(65) Prior Publication Data

US 2008/0298953 A1 Dec. 4, 2008

Related U.S. Application Data

(60) Provisional application No. 60/893,281, filed on Mar. 6, 2007.

(51) Int. Cl.
*B23P 13/04* (2006.01)

(52) U.S. Cl.
USPC .......... 29/557; 29/889.2; 415/144; 415/169.1

(58) Field of Classification Search
USPC ................. 60/602; 415/144, 169.1; 29/889.2, 29/557
See application file for complete search history.

(56) References Cited

U.S. PATENT DOCUMENTS

| | | | | |
|---|---|---|---|---|
| 4,138,849 | A * | 2/1979 | Wilber | 60/602 |
| 4,526,004 | A * | 7/1985 | French et al. | 60/602 |
| 6,178,956 | B1 * | 1/2001 | Steinmann et al. | 123/568.21 |
| 6,658,846 | B1 * | 12/2003 | McEwan | 60/602 |

* cited by examiner

*Primary Examiner* — Nathaniel Wiehe
*Assistant Examiner* — Adam W Brown
(74) *Attorney, Agent, or Firm* — William G. Anderson; Stephan A. Pendorf; Patent Central LLC

(57) ABSTRACT

A wastegate assembly (200) for a turbocharger (101) or the like is provided having a support plate (300), an actuator (275), a linkage (250) operably connected to the actuator (275), and a valve plate (225) operably connected to the linkage (250). The linkage (250) translates actuation of the actuator (275) to movement of the valve plate (225) thereby sealing or unsealing the bypass outlet (500). The actuator (275), linkage (250) and valve plate (225) can be pre-assembled to the support plate (300) prior to the support plate (300) being connected to the turbine housing (102). The actuator (275), linkage (250) and valve plate (225) can be calibrated prior to the wastegate assembly (200) being connected to the turbine housing (102). The bypass outlet (500) can be machined via access provided by the wastegate port (400).

13 Claims, 5 Drawing Sheets

WASTEGATE ASSEMBLY

CROSS REFERENCE TO RELATED APPLICATIONS

This application is related to and claims priority in, copending U.S. Provisional Application Ser. No. 60/893,281, filed Mar. 6, 2007, the disclosures of which are incorporated herein by reference.

FIELD OF THE INVENTION

This invention is directed to a turbocharging system for an internal combustion engine and more particularly to a turbine housing having a wastegate.

BACKGROUND OF THE INVENTION

Turbochargers are a type of forced induction system. They compress the air flowing into an engine, thus boosting the engine's horsepower without significantly increasing weight. Turbochargers use the exhaust flow from the engine to spin a turbine, which in turn drives an air compressor. Since the turbine spins about 30 times faster than most car engines and it is hooked up to the exhaust, the temperature in the turbine is very high. Additionally, due to the resulting high velocity of flow, turbochargers are subjected to noise and vibration. Such conditions can have a detrimental effect on the components of the turbocharger, particularly on the rotating parts such as the turbine rotor, which can lead to failure of the system.

The pressure developed by a centrifugal type of turbocharger however, varies as the square of the engine speed. An increase in delivery pressure sufficient to provide the required increased torque at low engine speed will greatly increase the delivery pressure at higher engine speed.

This problem has been overcome by incorporating a wastegate valve into the turbine side of the turbocharger. The wastegate valve allows engine exhaust gas to bypass the turbine nozzle and wheel as required. This serves to limit turbocharger speed at high engine speeds and loads. In doing so, the wastegate valve reduces the boost pressure attained at full speed full load to a desired amount.

One such contemporary wastegate valve assembly utilizes turbine pressure as the actuating mechanism. Such assemblies include a spring biased poppet valve arranged to open against the spring bias when the gas pressure entering the turbine wheel or the engine boost pressure exceeds a certain level. Opening of the poppet valve allows part of the exhaust gases to pass through the valve and to bypass the turbine nozzle and wheel. These valve assemblies have been shown to be unreliable and have a propensity for seizing in the closed position.

Another contemporary wastegate valve assembly is a controlled assembly that utilizes a pneumatic actuator to open and close the wastegate. These wastegate turbochargers are matched to give good performance at low engine speed with the valve closed. This can improve transient response and reduce exhaust temperatures and emissions. As engine speed increases, the wastegate valve begins to open at a pre-set boost pressure. This has the effect of increasing the swallowing capacity of the turbine, reducing shaft power and avoiding excess air delivery and rotor overspeed.

A turbocharger with a contemporary wastegate assembly is described in U.S. Pat. No. 6,658,846 to McEwan. The McEwan turbocharger 10, as shown in FIGS. 1 and 2, has a wastegate assembly 20 with a circular valve 30 positioned in the turbine section 40 for exhaust gas bypassing. The valve 30 is opened and closed by linkage 50 which is connected to a pneumatic control device 60. The pneumatic control device 60 is bolted to the compressor housing 70 by bolts 75 and is fed pressurized air from conduit 65. After assembly and mounting to the turbine and compressor housings 45, 70, the wastegate assembly 20 must then be calibrated in situ to ensure sufficient bypass at high engine speeds.

The McEwan wastegate assembly 20 suffers from several drawbacks. Assembly time and cost are increased because of the in situ calibration technique required, as well as the mounting across multiple sections of the turbocharger. The linkage 50 extends along a substantial length of the turbocharger 10 increasing the envelope of the turbocharger, which can be especially significant where space in an engine compartment is limited. Due to the limited access to the wastegate valve 30 once installed, machining to promote proper sealing is limited.

Thus, there is a need for a wastegate assembly that facilitates assembly. There is a further need for such an assembly that allows for pre-assembly and/or pre-calibration. There is yet a further need for such an assembly that facilitates machining for proper sealing. There is also a need for such an assembly that is cost effective and dependable.

SUMMARY OF THE INVENTION

The exemplary embodiment of the wastegate assembly, and the turbocharger that uses the assembly, allows for pre-assembly and/or pre-calibration. The exemplary embodiment of the wastegate assembly facilitates the manufacturing process, as well as machining for proper sealing. The exemplary embodiment of the wastegate assembly is cost effective and dependable.

In one aspect of an exemplary embodiment of the present invention, a wastegate assembly for a bypass port of a turbine housing for a turbocharger is provided. The wastegate assembly comprises an actuator; a linkage operably connected to the actuator; a valve plate operably connected to the linkage; and a support plate. The linkage translates actuation of the actuator to movement of the valve plate thereby sealing or unsealing the bypass outlet. The actuator, linkage and valve plate are connected only to the support plate. The support plate is connected to the turbine housing.

In another aspect, a turbocharger is provided comprising a compressor housing having a compressor wheel; a turbine housing having a turbine rotor, a turbine inlet, a bypass outlet and a wastegate port; and a wastegate assembly having a support plate, an actuator, a linkage operably connected to the actuator, and a valve plate operably connected to the linkage. The turbine rotor is operably connected to the compressor wheel for driving the compressor wheel. The linkage translates actuation of the actuator to movement of the valve plate thereby sealing or unsealing the bypass outlet. The actuator, linkage and valve plate are pre-assembled to the support plate. The support plate is connected to the turbine housing.

In another aspect, a method of manufacturing a turbocharger is provided. The method comprises forming a bypass outlet and a wastegate port in a turbine housing; pre-assembling a support plate, an actuator, a linkage operably connected to the actuator, and a valve plate operably connected to the linkage to form a wastegate assembly; positioning the valve plate through the wastegate port; and connecting the support plate to the turbine housing thereby mounting the wastegate assembly to the turbine housing. The linkage translates actuation of the actuator to movement of the valve plate thereby sealing or unsealing the bypass outlet.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Figure 1:
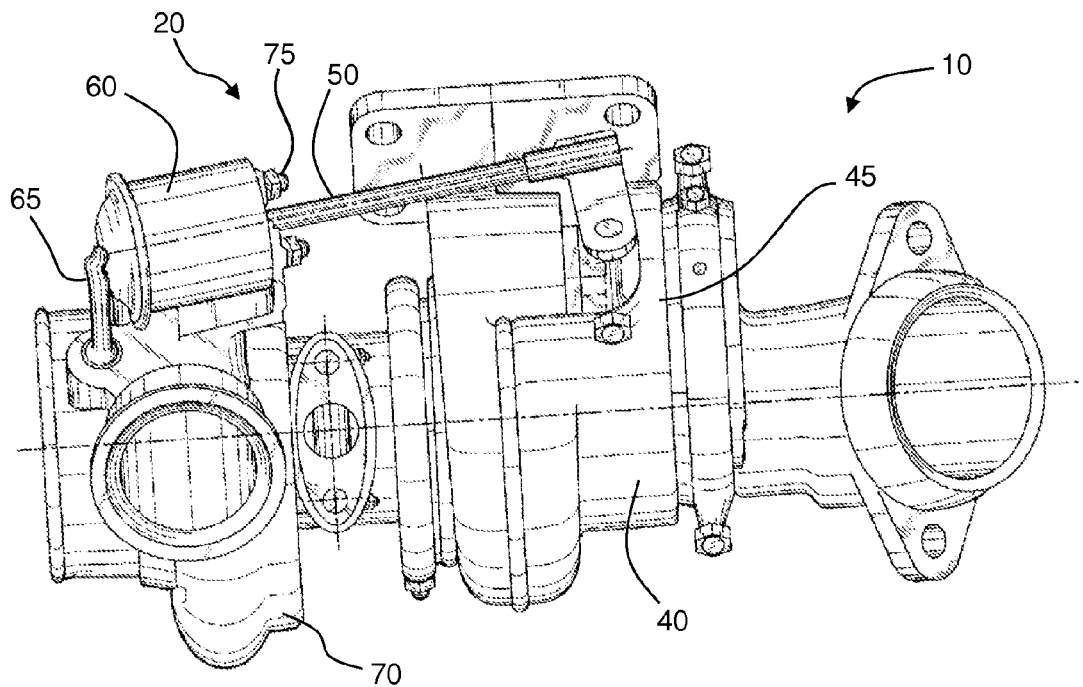
FIG. 1 is a perspective view of a contemporary turbocharger system.
Figure 2:
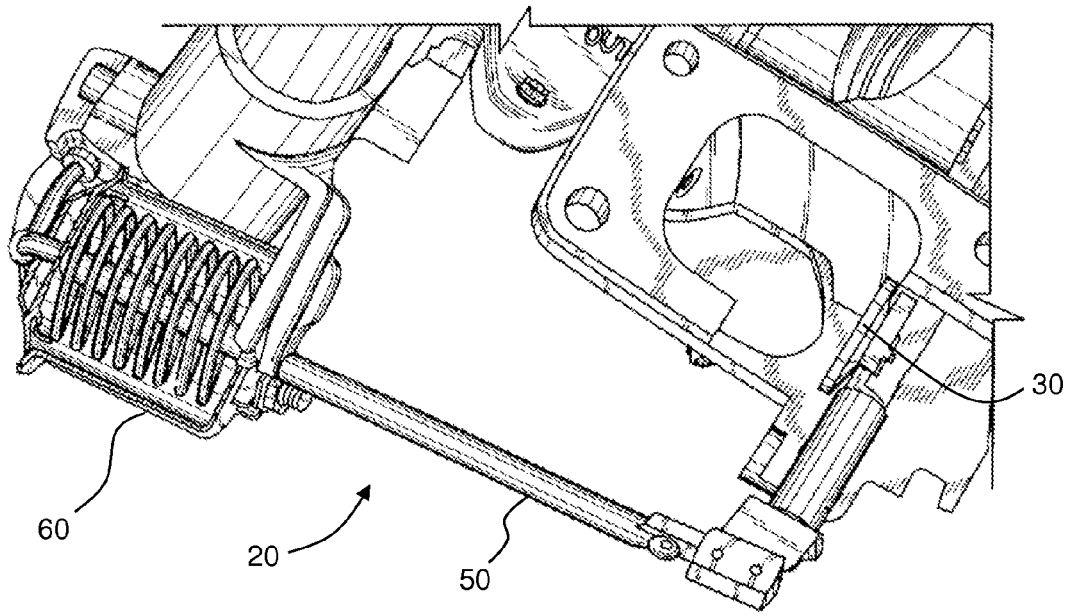
FIG. 2 is a cross-sectional view of the wastegate assembly of the contemporary turbocharger of FIG. 1.
Figure 3:
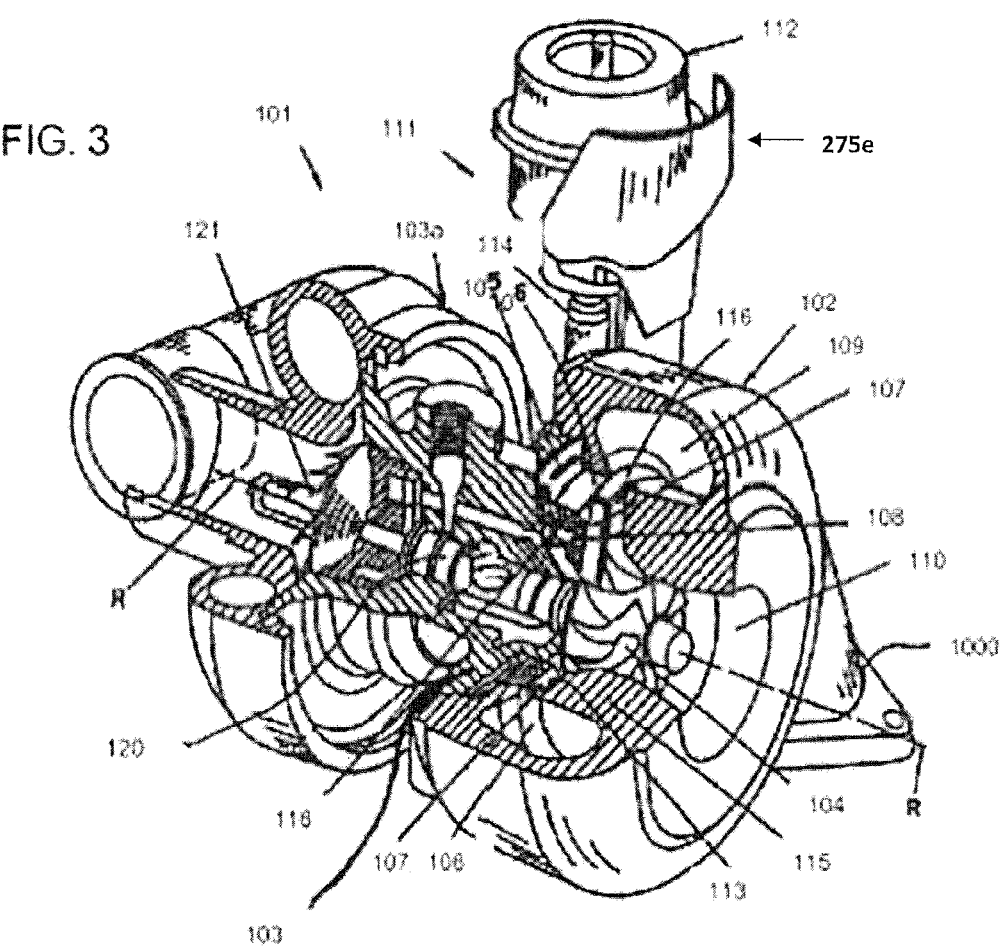
FIG. 3 is a perspective view of a turbocharger in accordance with an exemplary embodiment of the invention with the waste gate port hidden and the wastegate assembly not shown.
Figure 4:
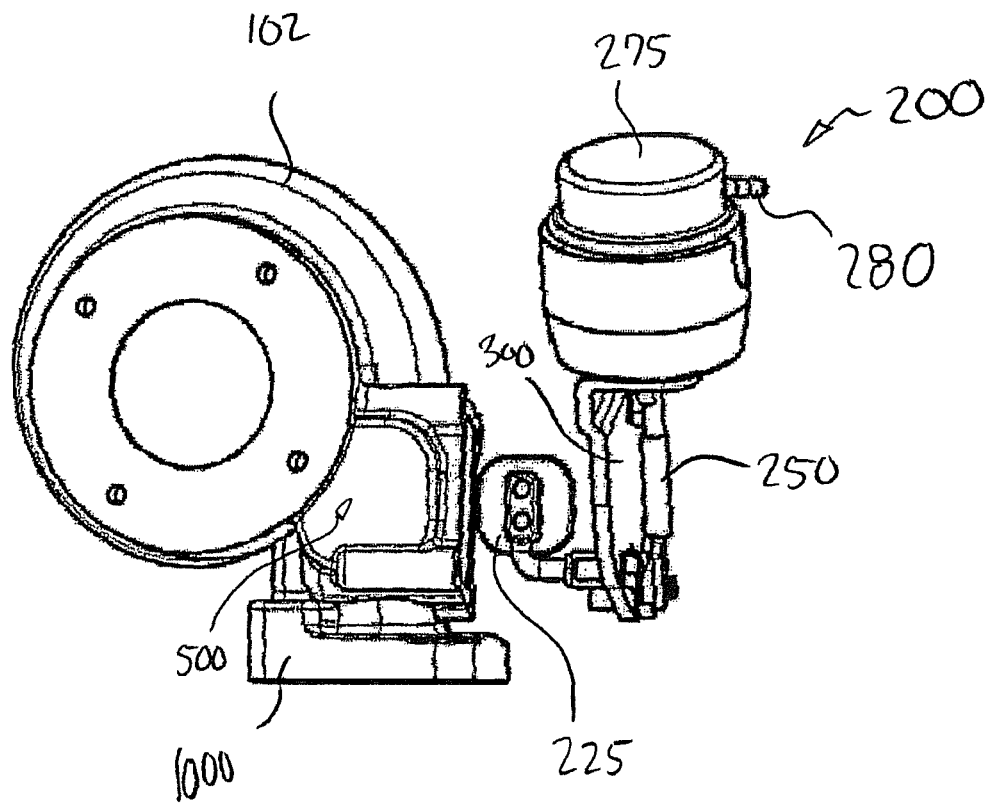
FIG. 4 is a perspective exploded view of the wastegate assembly of the turbocharger of FIG. 3 with the turbine section.
Figure 5:
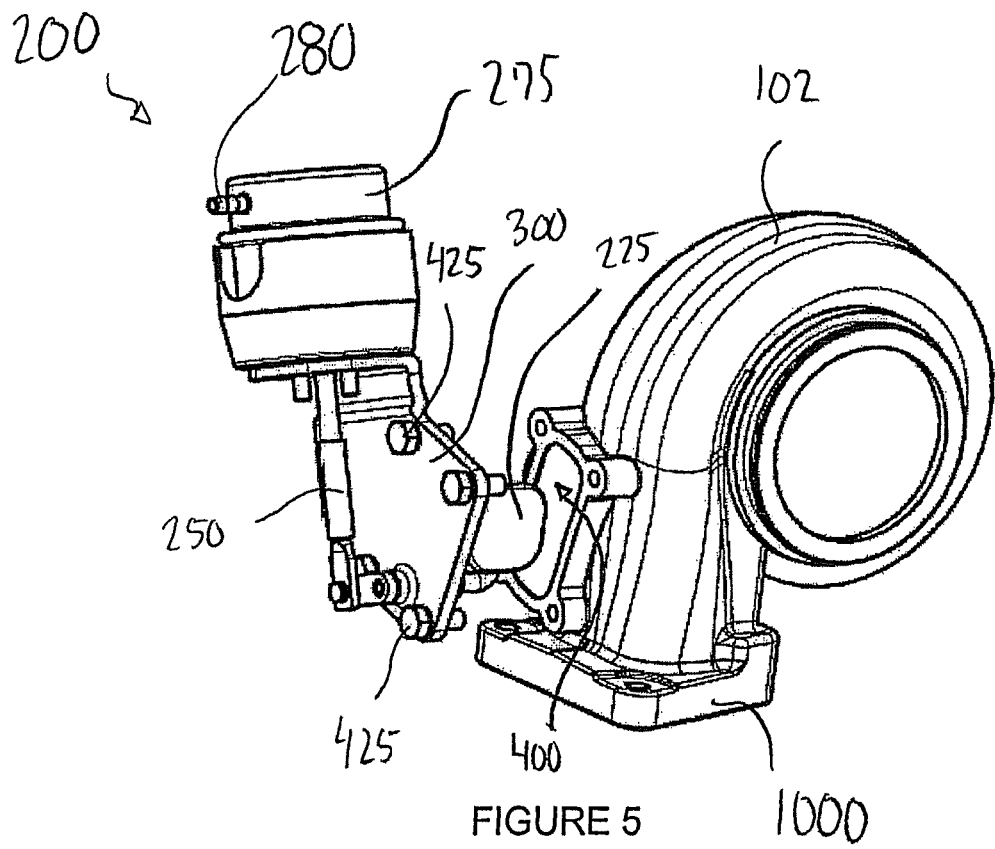
FIG. 5 is another perspective exploded view of the wastegate assembly of the turbocharger of FIG. 3 with the turbine section.
Figure 6:
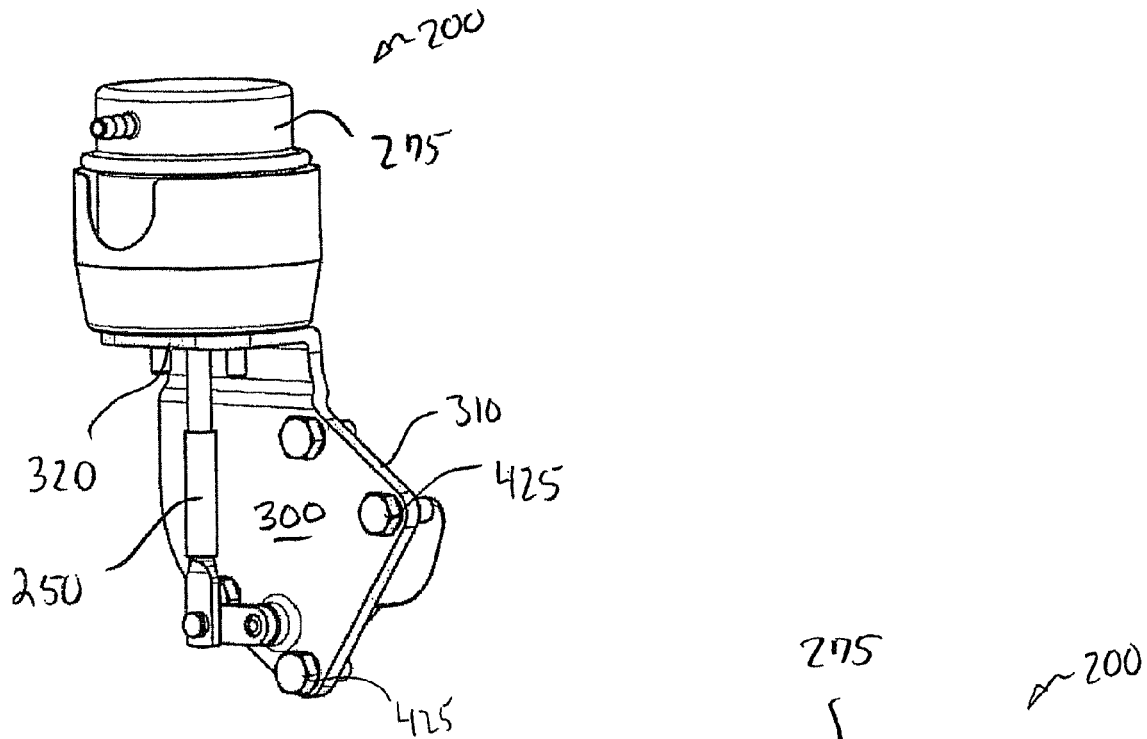
FIG. 6 is a perspective view of the wastegate assembly of the turbocharger of FIG. 3.
Figure 7:
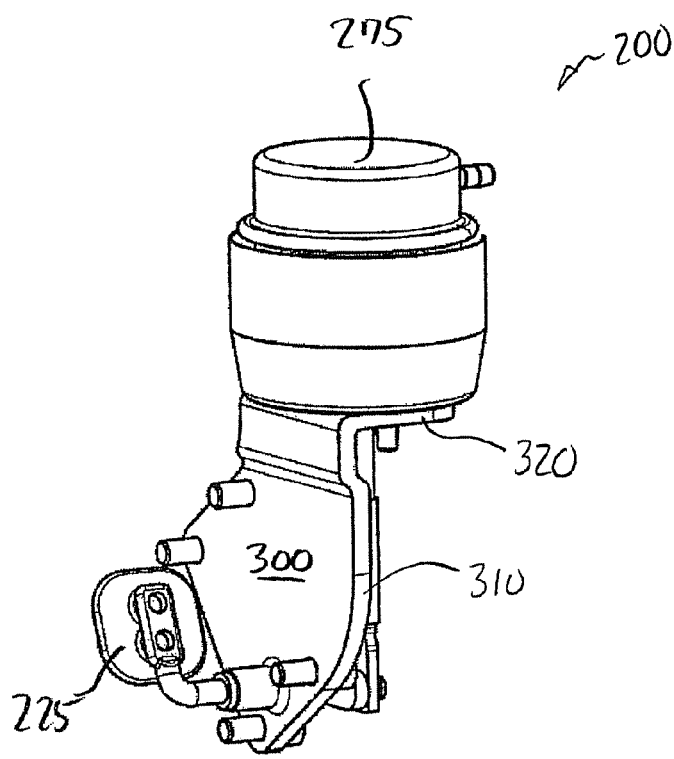
FIG. 7 is another perspective view of the wastegate assembly of the turbocharger of FIG. 3.
Figure 8:
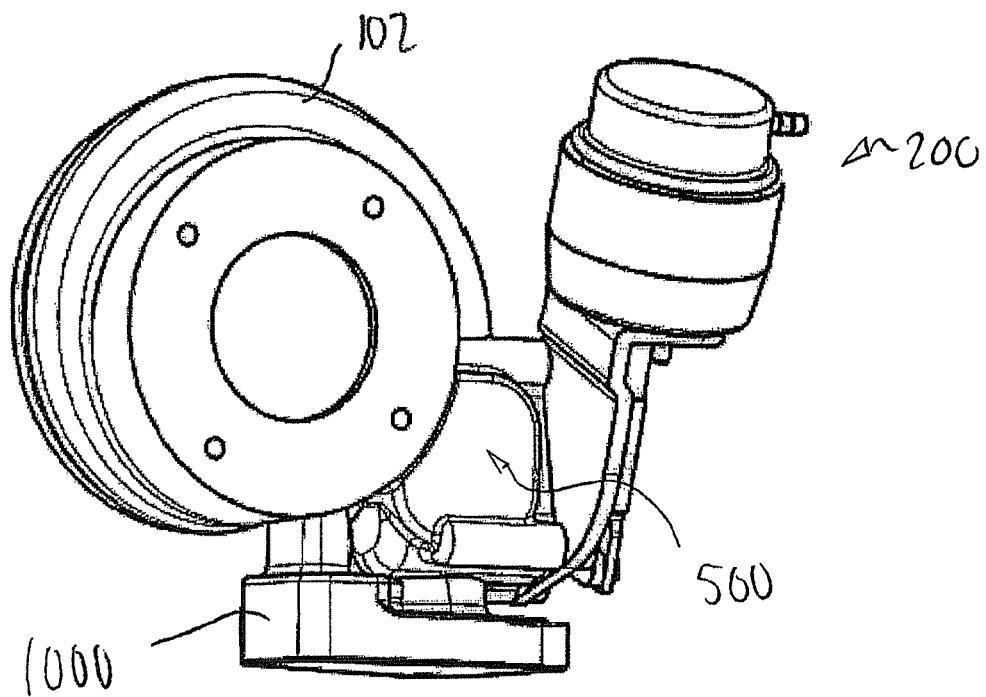
FIG. 8 is a perspective view of the wastegate assembly of the turbocharger of FIG. 3 assembled with the turbine section.
Figure 9:
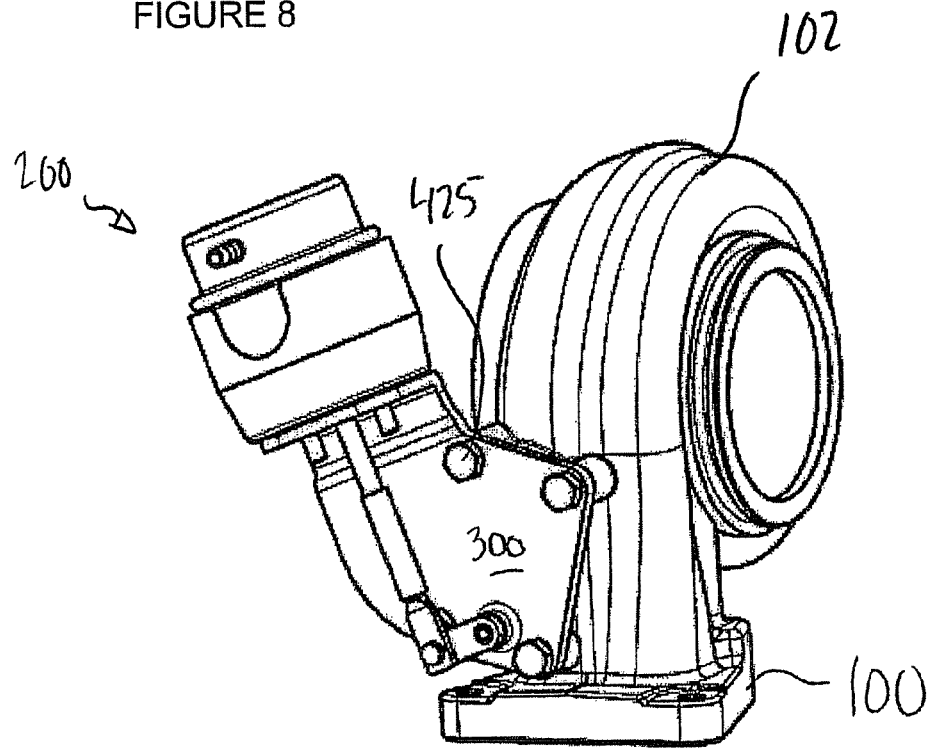
FIG. 9 is another perspective view of the wastegate assembly of the turbocharger of FIG. 3 assembled with the turbine section.

Referring to FIG. 3, a turbocharger 101 has a turbine housing 102, a center housing 103 and a compressor housing 103a connected to each other and positioned along an axis of rotation R. The turbine housing 102 has an outer guiding grid of guide vanes 107 over the circumference of a support ring 106. The guide vanes 107 may be pivoted by pivoting shafts 108 inserted into bores of the support ring 106 so that each pair of vanes define nozzles of selectively variable cross-section according to the pivoting position of the vanes 107. This allows for a larger or smaller amount of exhaust gases to be supplied to a turbine rotor 104.

The exhaust gases are provided to the guide vanes 107 and rotor 104 by a supply channel 109 having an inlet 1000. The exhaust gases are discharged through a central short feed pipe 110, and the rotor 104 drives the compressor wheel, impeller or rotor 121 fastened to the shaft 120 of the wheel. The present disclosure also contemplates one or more of turbine housing 102, center housing 103 and compressor housing 103a being integrally formed with each other.

In order to control the position of the guide vanes 107, an actuation device 111 can be provided having a control housing 112, which controls an actuation movement of a pestle member 114 housed therein, whose axial movement is converted into a rotational movement of an adjustment or control ring 105 situated behind the support ring 106. By this rotational movement, the guide vanes 107 may be displaced from a substantially tangential extreme position into a substantially radially extending extreme position. In this way, a larger or smaller amount of exhaust gases from a combustion motor supplied by the supply channel 109 can be fed to the turbine rotor 104, and discharged through the axial feed pipe 110.

Between the vane support ring 106 and a ring-shaped portion 115 of the turbine housing 102, there can be a relatively small space 113 to permit free movement of the vanes 107. The shape and dimensions of the vane space 113 can be chosen to increase the efficiency of the turbocharger 101, while allowing for thermal expansion due to the hot exhaust gases. To ensure the width of the vane space 113 and the distance of the vane support ring 106 from the opposite housing ring 115, the vane support ring 106 can have spacers 116 formed thereon. Various other turbocharger components can also be used with compressor wheel 121 and turbocharger 101.

Referring additionally to FIGS. 4-9, a wastegate assembly is shown and generally represented by reference numeral 200. The wastegate assembly 200 has a valve 225, a linkage 250 and an actuator 275. A mounting structure or housing, such as a plate 300, is provided so that the valve 225, linkage 250 and actuator 275 can be pre-assembled.

The plate 300 can have first and second portions 310, 320 to facilitate mounting with the turbine housing 102 and assembly with the linkage 250 and actuator 275. In the exemplary embodiment of wastegate assembly 200, the plate 300 has first and second portions 310, 320 that are orthogonal to each other or at some other angle. The shape and configuration of first portion 310 with respect to second portion 320 facilitates the translation of the linear movement of the actuator 275 with respect to the rotational valve 225 via the linkage 250. The first portion 310 of plate 300 can seal directly against the turbine housing 102. This direct engagement avoids the need for a separate sealing plate which adds cost to the assembly.

The particular size, shape and configuration of the plate 300 can be chosen based upon a number of factors, including the type of linkage 250 being used, as well as the space that the wastegate assembly 200 is intended to fit. The pre-assembly of the wastegate assembly 200 allows for calibration of the valve 225, linkage 250 and actuator 275 prior to mounting or assembly of the remaining portions of the turbocharger.

The wastegate assembly 200 is mounted to the turbine housing 102 by positioning the valve 225 through port 400 and securing the assembly by bolts 425. The present disclosure contemplates the use of other securing structures or techniques for mounting the wastegate assembly 200 with the turbine housing 102. Preferably, the wastegate assembly 200 is removable from the turbine housing 102.

The valve 225 is a square plate that can seal against a corresponding bypass outlet 500 in the turbine housing 102. The present disclosure contemplates the use of other shapes of the valve 225 and/or the bypass outlet 500, including circular valves and outlets. A ridge or other sealing structure can be formed along the periphery of the outlet 500 and/or valve 225 to further promote proper sealing. Port 400 also provides access to the bypass outlet 500 for machining and the like to ensure proper sealing of the valve 225 with the outlet.

The linkage 250 translates linear actuation from the actuator to rotational movement of the valve 225. The particular components of the linkage 250 can be chosen by one of ordinary skill in the art based upon a number of factors, including reliability and cost.

The actuator 275 is a pneumatic actuator having an inlet 280 connected to the compressor section of turbocharger 101 via a conduit or tubing (not shown). The present disclosure also contemplates the use of other pressure sources for the pneumatic actuator 275. The present disclosure further contemplates the use of other types of actuators, including hydraulic and vacuum actuators. In one embodiment, actuator 275 in an electronic actuator 275e (see FIG. 3). The electronic actuator 275e can use various components, such as a solenoid to drive the linkage 250.

While the present disclosure has been described with respect to a turbocharger having variable geometry guide vanes, it should be understood that the exemplary embodiment of the wastegate assembly 200 can be used with other types of turbochargers. It is also contemplated by the present disclosure that wastegate assembly 200 can be used with other types of fluid impelling devices that provide for bypass at high engine speeds.

While the invention has been described by reference to a specific embodiment chosen for purposes of illustration, it should be apparent that numerous modifications could be made thereto by those skilled in the art without departing from the spirit and scope of the invention.

The invention claimed is:

1. A method of manufacturing a turbocharger (101), the method comprising:
   forming a bypass outlet (500) and a wastegate port (400) in a turbine housing (102);
   machining the bypass outlet (500) by accessing the bypass outlet (500) through the wastegate port (400);
   pre-assembling a support plate (300), an actuator (275), a linkage (250) operably connected to the actuator (275), and a valve plate (225) operably connected to the linkage (250) to form a wastegate assembly (200);
   positioning the valve plate (225) through the wastegate port (400); and
   connecting the support plate (300) to the turbine housing (102) thereby mounting the wastegate assembly (200) to the turbine housing (102), wherein the linkage (250) translates actuation of the actuator (275) to movement of the valve plate (225) thereby sealing or unsealing the bypass outlet (500).

2. The method of claim 1, wherein the wastegate port (400) is formed on a first side of the turbine housing (102) and the bypass outlet (500) is formed on a second side of the turbine housing (102) adjacent to the first side.

3. The method of claim 1, wherein the support plate (300) has first and second portions (310, 320) that are at an angle to each other.

4. The method of claim 1, wherein the actuator (275), linkage (250) and valve plate (225) are connected only to the support plate (300).

5. The method of claim 1, further comprising calibrating the actuator (275), linkage (250) and valve plate (225) prior to connecting the support plate (300) to the turbine housing (102).

6. The method of claim 1, wherein the actuator (275) is electronic.

7. A method of manufacturing a turbocharger (101), the turbocharger (101) including a turbine housing (102) having a turbine inlet (1000), a bypass outlet (500) and a wastegate port (400), the method comprising:
   machining the bypass outlet (500) by accessing the bypass outlet (500) through the wastegate port (400).

8. The method of claim 7, wherein the wastegate port (400) is formed on a first side of the turbine housing (102) and the bypass outlet (500) is formed on a second side of the turbine housing (102) adjacent to the first side.

9. The method of claim 7, further comprising:
   pre-assembling a support plate (300), an actuator (275), a linkage (250) operably connected to the actuator (275), and a valve plate (225) operably connected to the linkage (250) to form a wastegate assembly (200);
   positioning the valve plate (225) through the wastegate port (400); and
   connecting the support plate (300) to the turbine housing (102) thereby mounting the wastegate assembly (200) to the turbine housing (102), wherein the linkage (250) translates actuation of the actuator (275) to movement of the valve plate (225) thereby sealing or unsealing the bypass outlet (500).

10. The method of claim 9, wherein the support plate (300) has first and second portions (310, 320) that are at an angle to each other.

11. The method of claim 9, wherein the actuator (275), linkage (250) and valve plate (225) are connected only to the support plate (300).

12. The method of claim 9, further comprising calibrating the actuator (275), linkage (250) and valve plate (225) prior to connecting the support plate (300) to the turbine housing (102).

13. The method of claim 9, wherein the actuator (275) is electronic.

* * * * *